United States Patent Office 2,738,183
Patented Mar. 13, 1956

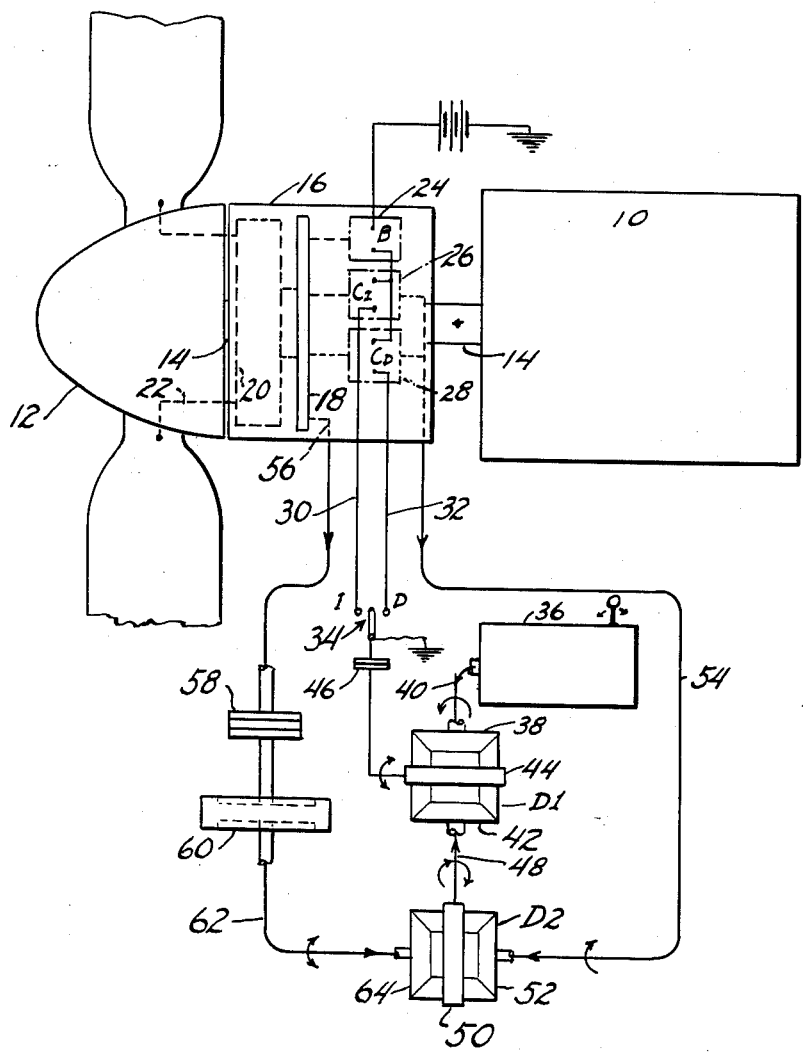

2,738,183

SPEED CONTROL SYSTEM

Paul J. Quinn, Wayne Township, and William H. Clark, Jr., Rutherford, N. J., assignors to Curtiss-Wright Corporation, a corporation of Delaware Application January 27, 1953, Serial No. 333,474

13 Claims. (Cl. 264—9)

This invention relates to speed controls for power plants and more particularly provides improvements in control systems for aircraft power plants driving controllable pitch propellers.

The invention provides, in particular, improvements and alternative arrangements relating to the type of control system shown and described in Quinn Patent No. 2,541,666 issued February 13, 1951. Also, the present invention provides a variation in the system shown in Hine patent application No. 188,745 filed October 6, 1950.

When applied to controllable pitch aircraft propellers, the invention is adapted for use with the type of propeller equipped with a movable member which moves when pitch variation of the propeller is made. This member ordinarily will comprise a part of the pitch changing power train and is one which would be available to derive additional power for speed control purposes. Propellers of this type are shown in Chillson patent application No. 675,383 filed June 8, 1946, now U. S. Patent No. 2,640,-552, and in Mergen et al. patent application No. 143,636 filed February 11, 1950.

The control system shown herein and later described in detail provides means for adjusting the pitch of a propeller for the purpose of increasing and decreasing the driven load of a power plant in order that the speed of rotation of the propeller may be maintained constant regardless of power variations and regardless of transient influences which may tend to alter the speed of the power plant. A fundamental speed reference is used which may comprise a governor or a mechanism providing a reference speed. The latter type of device is ordinarily used when synchronization of a plurality of power plants is required. To secure precise speed control without overspeeding of the propeller and without hunting, it is desirable to provide anticipatory control factors which compensate for the lag of the power plant system and for the lag in the speed control system. Previous types of systems use acceleration stabilization in forms variously called droop stabilization and derivative stabilization. This invention differs from prior types of controls as will be explained. The general requirement for stabilized systems is to sense the acceleration or deceleration of the power plant as it occurs and to impress on the speed control system, the acceleration signal, in addition to a signal representing speed error between the propeller and the reference speed. Thus, the pitch change will anticipate speed deviations and the propeller will attain a pitch condition, expeditiously, which represents the equilibrium pitch value for the stable constant speed. At times, the pitch angle may overshoot or undershoot the equilibrium condition, and will then return to the equilibrium condition, to attain on-speed for the power plant in a minimum length of time.

In the present invention, an anticipatory signal is derived from the propeller pitch changing mechanism. The signal hereinafter called a delayed rate signal, comprises the rate of propeller pitch change, modified by to lag in its action in consonance with the lag of the power plant as the latter changes speed from one level to another.

While the drawing of the present invention includes a controllable pitch propeller as a means for controlling power plant speed, the principles of the invention may be applied to other plant speed controlling devices such as fuel control and other forms of load control.

The single figure of the drawings shows schematically, the control components of the invention as applied to a conventionalized power plant-propeller assembly.

In the drawings a power plant 10 drives a propeller 12 by means of a shaft 14 passing through a pitch changing mechanism 15. As noted previously, the pitch changing mechanism may be of any appropriate type, but as shown, comprises a gear 18 which is normally non-rotative but which may be rotated in either direction to increase or decrease the pitch of the blades of the propeller. The gear 18 is drivably connected to transfer gearing 20 to transmit pitch changing movements to the blades through driving connections 22. The gear 18 is held from rotation, normally, by a brake 24. When pitch change is required, the brake is released and either clutch 26 or 28 is engaged respectively to increase or decrease propeller blade pitch. The clutches 26 and 28 are driven from the power shaft 14 and the output elements of the clutches are connected to rotate the gear 18. The clutches and brake may be electrically operated and interconnected as shown, electrical connections being shown at 30 and 32 which may be respectively energized by a switch 34, the switch arm of which may be grounded. Circuits for both clutches 26 and 28 are completed through the brake 24 and thence to a power source and the ground. The brake is so arranged that electrical energization thereof disengages it and permits the gear 18 to rotate freely. As soon as the electrical energization is terminated, the appropriate clutch is disengaged, and the brake is permitted to engage through the action of a spring to hold the gear 18 from further rotation.

A propeller of this type is disclosed in one of the applications mentioned heretofore so that a more detailed description of its mechanisms is deemed unnecessary. Pitch change in either direction is initiated by closure of the switch 34 in the appropriate direction.

To control the propeller to constant speed operation, a reference speed source 36 is provided. This may either be an appropriate governor assembly or a reference speed motor whose power source may be combined with the reference speed sources of other power plants in a multiple power plant installation. The output from the source 36 drives a side gear 38 of a differential D1 through a driving connection 40. The other side gear 42 of the differential D1 is driven, as will be described, at power plant speed modified to provide anticipatory propeller control. The gears 38 and 42 are driven in opposite directions so that the output 44 of the differential will rotate at the difference in speed of the gears 38 and 42. The output 44 is connected through a light slip clutch 46 to operate the switch 34. When a requirement for pitch correction is manifested by rotation of the differential output 44, the switch 34 will close in the appropriate direction which will energize the pitch changing mechanism to produce pitch correction at the full pitch change rate of which the mechanism is capable. This rate is limited by the design of the equipment and normally is of the order of 20 degrees per second.

The face gear 42 of differential D1 is driven through a connection 48 from the output 50 of a differential D2. One side gear 52 of differential D2 is driven through a connection 54 by, and at a speed proportional to the speed of the propeller shaft 14.

A driving connection 56, such as a pinion meshing with the gear 18, is connected to the driving end of a slip clutch 58, the driven end of which carries a flywheel or other appropriate mass 60 and is connected through a connection 62 to the other side gear 64 of differential D2. The clutch or coupling 58 is chosen from that type of mechanism wherein the output torque is substantially proportional to the speed difference between the clutch input and the clutch output. The flywheel 60 is so selected that its lag in attaining the speed of the input and consequently the delayed rate signal to the gear 64, is substantially the same as the lag characteristics of the power plant assembly in changing speed from one level to another. The flywheel, then, will impose a positive or negative bias on power plant speed through the differential D2 so that the output of the differential D2 will include both engine speed and delayed rate signals. From this, the output of the differential D1 will include the delayed rate signal to influence the opening and closing of the switch 34, either to stop or change the sense of pitch correction in anticipation of speed overshoot of the power plant.

One sequence of the operation of the system may be visualized from the following: Assume that the reference speed source has been increased from one desired operating speed level to a higher speed level. Thereupon, the differential D1 compares the signals from the speed source and from the power plant and signals an underspeed condition to the switch 34, thereby energizing the decrease pitch clutch 28 to initiate pitch decrease of the propeller. Almost immediately, upon sensing the offspeed, the gear 18 starts to produce pitch reduction. As this action starts, the clutch 58 is rotated, accelerating the flywheel 60 and inserting in the control linkage, through the differential D2, the delayed rate signal. This signal is imposed in the direction to subtract from the off-speed. As the off-speed decreases due to pitch correction, the delayed rate correction inserted due to acceleration equals the underspeed error and opens the switch 34, terminating pitch change. Although an off-speed error still exists, energization of the flywheel 60 will have ceased whereby the flywheel decelerates through the drag imposed by the clutch 58 at a decay rate simulating power plant lag. The power plant then attains on-speed without further pitch correction.

Adjustment of the ratios and constants of the system may also produce the effect where the rate sensitive part of the system can hold the full rate pitch correction until the power plant is nearly on-speed. Then, pitch change reverses, and finally attains the equilibrium pitch angle substantially simultaneously as the power plant reaches the on-speed condition.

The general mode of operation of this system is quite similar, functionally, to that described more fully in Quinn Patent No. 2,541,666 mentioned above, but the means for attaining the anticipatory control is different, and comprises the essence of inventive subject matter which distinguishes this invention from that described in the Quinn patent.

In the drawings, mechanical differentials D1 and D2 are shown and it is to be understood that the invention, insofar as the claims permit, includes differential apparatus, in addition to purely mechanical devices, such as electronic, electro-mechanical or hydraulic devices. Similarly, the various control connections need not necessarily be purely mechanical drives but may be replaced by other signal transmission means.

The type of propeller shown in the drawing is not specifically a part of this invention and various different types may be used in conjunction with the control system of the invention so long as the propeller pitch changing mechanism, or speed adjuster includes a device which is movable, or is energized, to initiate pitch or speed change. Such device is utilized to drive the anticipatory control elements of the invention.

It will be noted that the anticipatory control part of the invention combines true rate stabilization with synthesized stabilization. The synthesized part is controlled by the characteristics of the flywheel 60 and by the range of torque which is permitted in the coupling 58. It will be noted, however, that rotation of the input end of the coupling 58 is a true measure of the rate of change of pitch so that the combination of the elements can readily produce a signal which simulates the lag of the power plant under the operating conditions thereof.

Though one embodiment of the invention is shown, it is to be understood that the invention may be applied in various forms and in various environments. Changes may be made in the arrangements shown without departing from the spirit of the invention. Reference should be had to the appended claims for definition of the limits of the invention:

What is claimed is:

1. In a speed control system for a power plant having a speed controller and including as a part thereof a member movable as speed is being controlled, means establishing a desired speed datum, means to compare power plant and datum speed, as components, productive of a speed error signal, means driven by said member when said member is in operation productive of a second signal indicative of power plant acceleration, means to combine said latter signal with a component of said error signal, and means operated by the combined signals to actuate said speed controller.

2. In a speed control system for a power plant having a speed controller and including as a part thereof a member movable as speed is being controlled, means establishing a desired speed datum, means to compare power plant and datum speed, as components, productive of a speed error signal, means driven by said member when said member is in operation productive of a second signal indicative of power plant acceleration, means to combine said latter signal with a component of said error signal, and means operated by the combined signals to actuate said speed controller, said comparing and combining means comprising differentials together having three inputs and one output, the inputs comprising power plant speed, reference speed and said acceleration indicative signal, and said output being connected to operate said speed controller.

3. In a speed control system for a power plant having an adjustable driven load, means to adjust said load including a rotatable member, a mechanism to sense offspeed of the power plant from a desired speed, said offspeed having a power plant speed component and a desired speed component, said mechanism having an output movable in response to offspeed connected to adjust said adjusting means, a slip coupling driven by and connected to said rotatable member, an inertia mass rotatably driven by said coupling, and means connected to said mass to modify a component of said offspeed in accordance with rotation of said mass.

4. In a speed control system for a power plant having an adjustable driven load, means to adjust said load including a rotatable member, a mechanism to sense offspeed of the power plant from a desired speed, said offspeed having a power plant speed component and a desired speed component, said mechanism having an output movable in response to offspeed connected to adjust said adjusting means, a slip coupling driven by and connected to said rotatable member, an inertia mass rotatably driven by said coupling, and means connected to said mass to modify a component of said offspeed in accordance with rotation of said mass, said coupling having an output torque proportional to the speed difference between said rotatable member and said flywheel.

5. In a speed control system for a mechanism having an adjustable speed controller, said controller being movable during speed adjustments of the mechanism, means to sense offspeed of the mechanism from a desired speed, means actuated by said sensing means connected to adjust said controller, a drive take-off from said controller including a yieldable coupling and an inertia mass, and means connecting said mass to modify adjustment of said controller by said actuated means.

6. In a speed control system for a mechanism having an adjustable speed controller, said controller being movable during speed adjustments of the mechanism, means to sense offspeed of the mechanism from a desired speed, means actuated by said sensing means connected to adjust said controller, a drive take-off from said controller including a yieldable coupling and an inertia mass, and means connecting said mass to modify adjustment of said controller by said actuated means, said sensing means and said connecting means comprising a mixing device having three inputs and an output to said controller, said inputs being connected to said mechanism, to a speed reference and to said inertia mass.

7. In a speed control system for a mechanism having an adjustable speed controller, said controller including a member movable during speed adjustments of the mechanism, a reference speed source, means for comparing mechanism speed and reference speed productive of a speed error signal, a slip coupling driven by and connected to said member, an inertia mass driven by and connected to said coupling, and a connection from said inertia mass to said comparing means, said mass biasing said speed error signal through said connection according to movement of said mass.

8. In a speed control system for a power plant having a variable driven load, means adjustable to increase and decrease said load, a member operated by said means and movable during changes in said load, a speed reference source, a movable inertia mass, a yieldable drive coupling connecting said member and said mass, and comparing and summing differential means having three inputs and an output, the output having a connection to operate said adjustable means, and said inputs being connected for drive by said power plant, said speed reference source and said movable mass.

9. In a speed control system for a power plant having a variable driven load, means adjustable to increase and decrease said load, a member operated by said means and movable during changes in said load, a speed reference source, a movable inertia mass, a yieldable drive coupling connecting said member and said mass, and comparing and summing differential means having three inputs and an output, the output having a connection to operate said adjustable means, and said inputs being connected for drive by said power plant, said speed reference source and said movable mass, said yieldable drive coupling having a transmitting torque substantially equal to the speed difference between said movable member and said mass.

10. In a speed control system for a power plant having a variable driven load, means adjustable to increase and decrease said load, a member operated by said means and movable during changes in said load, a speed reference source, a movable inertia mass, a yieldable drive coupling connecting said member and said mass, and comparing and summing differential means having three inputs and an output, the output having a connection to operate said adjustable means, and said inputs being connected for drive by said power plant, said speed reference source and said movable mass, said yieldable drive coupling having a transmitting torque substantially equal to the speed difference between said movable member and said mass, and said mass and coupling jointly having lag characteristics substantially the same as power plant lag in attaining a new speed level from a prior different speed level.

11. A speed control system for a power plant having a variable driven load, the latter including a mechanism energizable to increase and decrease load and including a member rotatable during load change, means to sense speed errors of the power plant from a desired speed and productive of a signal to actuate said mechanism, a yieldable coupling driven by said member, a rotatable mass driven by said coupling, a summing device drivably connected to said rotatable mass and drivably connected to said power plant to add, algebraically, the mass movement and the power plant speed, said summing device having an output element rotatable according to the summed mass movement and power plant speed, and a connection from said output to drive said sensing means.

12. A speed control system for a power plant having a variable driven load, the latter including a mechanism energizable to increase and decrease load and including a member rotatable during load change, means to sense speed errors of the power plant from a desired speed and productive of a signal to actuate said mechanism, a yieldable coupling driven by said member, a rotatable mass driven by said coupling, a summing device drivably connected to said rotatable mass and drivably connected to said power plant to add, algebraically, the mass movement and the power plant speed, said summing device having an output element rotatable according to the summed mass movement and power plant speed, and a connection from said output to drive said sensing means, said summing device comprising a differential.

13. A speed control system for a power plant, including a mechanism energizable to increase and decrease power plant speed and including a member rotatable during mechanism operation and driven thereby, means to sense speed errors of the power plant from a desired speed and productive of a signal to actuate said mechanism, a yieldable coupling driven by said member, a rotatable mass driven by said coupling, a summing device drivably connected to said rotatable mass and drivably connected to said power plant to add, algebraically, the mass movement and power plant speed, said summing device having an output element rotatable according to summed mass movement and power plant speed, and a connection from said output to drive said sensing means.

References Cited in the file of this patent

UNITED STATES PATENTS

| | | |
|---|---|---|
| 2,399,685 | McCoy | May 7, 1946 |
| 2,494,092 | Hayward | Jan. 10, 1950 |

FOREIGN PATENTS

| | | |
|---|---|---|
| 517,117 | Great Britain | Jan. 22, 1940 |